United States Patent

[11] 3,618,033

[72] Inventors Walter R. Nordquist
Naperville;
Wing N. Toy, Glen Ellyn, both of Ill.

[21] Appl. No. 787,185
[22] Filed Dec. 26, 1968
[45] Patented Nov. 2, 1971

[73] Assignee Bell Telephone Laboratories Incorporated
Murray Hill, Berkeley Heights, N.J.

[54] TRANSISTOR SHIFT REGISTER USING BIDIRECTIONAL GATES CONNECTED BETWEEN REGISTER STAGES
6 Claims, 6 Drawing Figs.

[52] U.S. Cl. .......... 340/172.5, 307/221, 328/37, 328/42
[51] Int. Cl. .......... H03k 21/00, H03k 23/00
[50] Field of Search .......... 235/157; 340/172.5; 307/221; 328/37, 42

[56] References Cited

UNITED STATES PATENTS

| | | | |
|---|---|---|---|
| 3,488,634 | 1/1970 | Mager | 340/172.5 |
| 3,041,476 | 6/1962 | Parker | 328/42 |
| 3,051,848 | 8/1962 | Clark | 328/37 X |
| 3,210,559 | 10/1965 | Gabriel | 307/221 X |
| 3,248,562 | 4/1966 | Felcheck | 307/221 |
| 3,268,740 | 8/1966 | Rywak | 307/221 X |
| 3,384,760 | 5/1968 | Cooperman | 328/37 |
| 3,384,761 | 5/1968 | Olson et al. | 328/42 |
| 3,508,212 | 4/1970 | Ault | 340/172.5 X |

*Primary Examiner*—Raulfe B. Zache
*Assistant Examiner*—Melvin B. Chapnick
*Attorneys*—R. J. Guenther and James Warren Falk

ABSTRACT: Shift register circuitry is disclosed in which bidirectional gates are connected between register stages in such a manner that data may be shifted in either direction through a gate to alter the state of either interconnected stage. By use of the bidirectional gates the shift register circuitry can store the logical AND or OR of the contents of the interconnected stages without employing additional complex control or steering circuitry intermediate the register stages. The shift register circuitry can also be used in various data processing shift and rotate functions in which a second register acts as intermediary for the shifting or rotation of data through a first register.

INVENTORS: W. R. NORDQUIST
W. N. TOY
BY
R. C. Winter
ATTORNEY

TRANSISTOR SHIFT REGISTER USING BIDIRECTIONAL GATES CONNECTED BETWEEN REGISTER STAGES

BACKGROUND OF THE INVENTION

In data processing machines the state of a bistable device may be used to represent binary data. It is frequently desirable to transfer this data to a second bistable device in response to a control signal by causing the second device to assume a stable state corresponding to that of the first. A shift register is simply an extension of this concept to a number of stages, each comprising such a bistable device, for the purpose of storing and manipulating binary data. Upon the application of a control signal, such as a shift pulse, the data or information represented by the state of each stage in the register may be shifted or transferred to another stage in the same or another register.

The transfer of data between register stages requires a steering network subject to external control pulses, to deliver the stored data to the desired destination stage. The shift register is versatile in its storage capability, i.e., it can store data, shift it in either direction, erase it or transfer it to another register. The price of such flexibility, however, is added complexity in the steering circuitry for each new operation. Thus, as the versatility of the register increases, the complexity and consequently the cost of its control circuitry increases as well. Efforts to reduce this complexity, e.g., by combining operations as noted in the prior art, have met with some success, albeit at a sacrifice of speed in many instances.

SUMMARY OF THE INVENTION

In accordance with our invention, this problem is solved by the employment of bilateral or bidirectional gates between register stages. The source impedance of a given binary output signal terminal of each bistable device, typically a flip-flop, is established at substantially different values for the two binary states. Thus, the output having low-source impedance can, with the aid of the bidirectional gate, cause the voltage at the output of the receiving flip-flop to be at a value close to the voltage at the output of the transmitting flip-flop. The receiving flip-flop will switch, if necessary, so that the two flip-flops then will contain the same information.

If the first set of corresponding output terminals of the transmitting and receiving flip-flops is connected respectively to the input and output leads of the bidirectional gate and the receiving register is cleared prior to enabling the bidirectional gate, the condition present at the output terminal of the transmitting register is transferred to the receiving register. Similarly, if the second set of corresponding output terminals of the transmitting and receiving flip-flops is connected to the corresponding input and output leads of the bidirectional gates and the receiving register is set prior to enabling the bidirectional gate, the condition present at the output terminal of the transmitting register may be transferred to the receiving register.

Advantageously, many logic functions may be performed by this arrangement. In the case of the interconnected first set of output terminals of the flip-flops, for example, failure to clear either flip-flop prior to enabling the bidirectional gate will result in the storage of the logical OR of the content of the two flip-flops. Similarly, failure to set the flip-flops prior to enabling the bidirectional gate for the case in which the second set of output terminals of the flip-flops are interconnected will result in the storage of the logical AND in the two flip-flops. Thus, all of the versatility of the shift register may be exploited without having to resort to additional complex control or steering circuitry intermediate shift register stages.

Such versatility permits distinct advantages in more complex shift register operations such as those utilized in data processing applications. These include shift and rotate functions in which a second register acts as an intermediary for the shifting or rotation of data through a first register. A single bidirectional gate can be utilized, in this instance, to accomplish the data transfers in both directions between corresponding stages of the two registers. The resultant economies are enhanced by simplifications in the programming of particular operations. For example, a rotation of data in either direction through the first register is achieved by a transfer to and rotation in one direction through the second register followed by a transfer to and rotation in the opposite direction through the first register. A left rotation is converted to a right rotation simply by reversing the order of operation of the intermediate bidirectional gates. Furthermore, a rotation is converted to a shift operation merely by clearing predetermined stages in the second register intermediate the two rotation operations. Of particular significance is the fact that these predetermined stages are the same regardless of the direction of the desired shift.

Further advantages may be derived from the utilization of a time-shared transmission bus accessible to a number of shift registers via the bidirectional gates. Such an arrangement reduces by one-half the number of gates required for similar operations in the prior art, the further requirement being that each signal transfer path will include two bidirectional gates connected in series via the time-shared bus.

THE DRAWING

Figure 1:
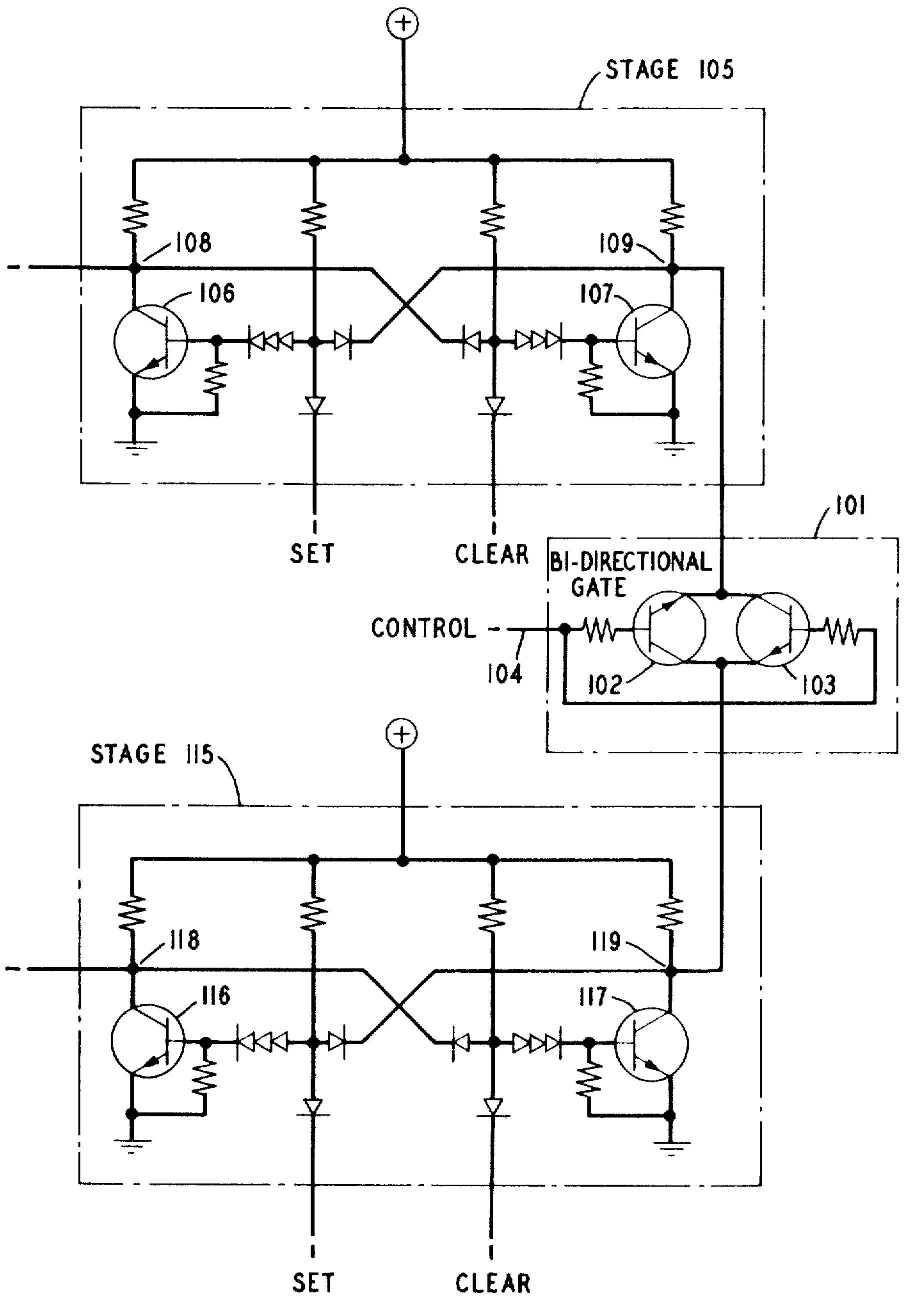
FIG. 1 depicts in schematic form two flip-flop stages interconnected via a bidirectional gate in accordance with the illustrative embodiment of this invention.

Turning now to FIG. 1, a simple bidirectional gate 101 is shown connected between corresponding signal terminals 109 and 119 of two register stages. The bidirectional gate 101 comprises a pair of transistors 102 and 103 connected in opposition. Thus, upon application of a control signal on lead 104 to the base of each transistor 102 and 103, a signal may be transferred from stage 105 to stage 115 via transistor 102 or from stage 115 to stage 105 via transistor 103. A bipolar arrangement is illustrated, which arrangement may utilize NPN-transistors. A unipolar version also may be employed in which case the bidirectional gate would comprise a P-channel, enhancement-mode, insulated gate, field effect transistor as known in the art.

Each of the register stages 105 and 115 may consist of a simple bistable circuit such as a flip-flop. Thus, stage 105 consists of transistors 106 and 107, which are cross coupled between respective base and collector electrodes to form the classic flip-flop arrangement. Similarly, stage 115 comprises transistors 116 and 117 which are cross coupled in the same fashion as the transistors in stage 105. Each of the register stages is provided with means for setting it to one of its stable states and for resetting or clearing it to its other stable state.

The transistors are designed so as to saturate if the potentials at their bases with respect to their emitters, which are generally at ground potential, are within a voltage range noted as the binary "1" voltage range, and so that the transistors will be biased off if the potentials at their bases with respect to their emitters are within a voltage range denoted as the binary "0" voltage range. These voltage ranges obviously vary depending upon the characteristics of the transistors utilized, as is well known in the art. In such circuits the potential at the collector of a saturated transistor will be within the "0" voltage range, and the collector of a cutoff transistor will be in the "1" voltage range. When the collector of a first transistor is connected to the base of a second transistor in a similar configuration, the second transistor will be cut off when the first transistor is saturated, and the second transistor will be saturated when the first transistor is cut off.

The flip-flop transistors in register stages 105 and 115 have substantially these characteristics. In this example bidirectional gate 101 is connected to the collector terminal of each of transistors 107 and 117 in the respective stages 105 and 115. The operations producing the desired flip-flop states by application of control signals on the "set" and "clear" leads will be described briefly. Assuming initially that transistor 106 is cut off, the potential at its collector terminal will be within the "1" voltage range. This potential, which is applied to the base of transistor 107, will be sufficient to cause transistor 107 to become saturated so that the potential at its collector terminal will be within the "0" voltage range. The potential at the collector terminal 109 of transistor 107, in turn, is coupled to the base of transistor 106. A signal within the "0" voltage range on the clear input of stage 105 at this time will cause transistor 107 to be cut off so that the potential at the collector terminal 109 will change from the "0" to the "1" voltage range. This in turn turns on transistor 106 and causes the potential at its collector terminal 108 to change from the "1" to the "0" voltage range. This latter voltage then maintains transistor 106 in the saturated state. If it is now desired to restore stage 105 to its original condition, a "0" voltage signal will be applied on the set lead such that the reverse operations will be followed, restoring the "1" condition to terminal 108 and the "0" condition to terminal 109.

If the bidirectional gate 101 is to achieve the desired function, the source impedance of each of the outputs at terminals 109 and 119 from stages 105 and 115 respectively must be substantially different for the two binary states. In this fashion, the output having low-source impedance can, with the aid of the bidirectional gate, cause the voltage at the receiving flip-flop to be at a value close to the voltage at the output of the transmitting flip-flop. The receiving flip-flop then will switch, if necessary, so that the two flip-flops will contain the same information. The threshold of the flip-flops must, of course, be sufficient to permit regeneration to take place reliably. Such flip-flops are readily available in the art.

Consider, for example, that stage 105 reflects the "1" state; e.g., 0.2 volt at terminal 109 in one trial operation, and it is desired to transfer this state to stage 115. All that is required in this instance is to clear stage 115 to the "0" state; e.g., 4 volts at terminal 119 in the trial, and then apply a control pulse to lead 104. If a transfer in the opposite direction is desired instead, stage 105 is cleared in advance of the control pulse application rather than stage 115. If neither stage is cleared prior to enabling gate 101, each stage will assume the "1" state if a "1" previously was present in either stage, i.e., the logical OR.

Another possible arrangement is to connect terminals 108 and 118 through gate 101. In this instance the receiving stage is set to "1" prior to enabling gate 101, resulting in a "0" transfer. Failure to set either stage will result in a logical AND operation.

Figure 2A:
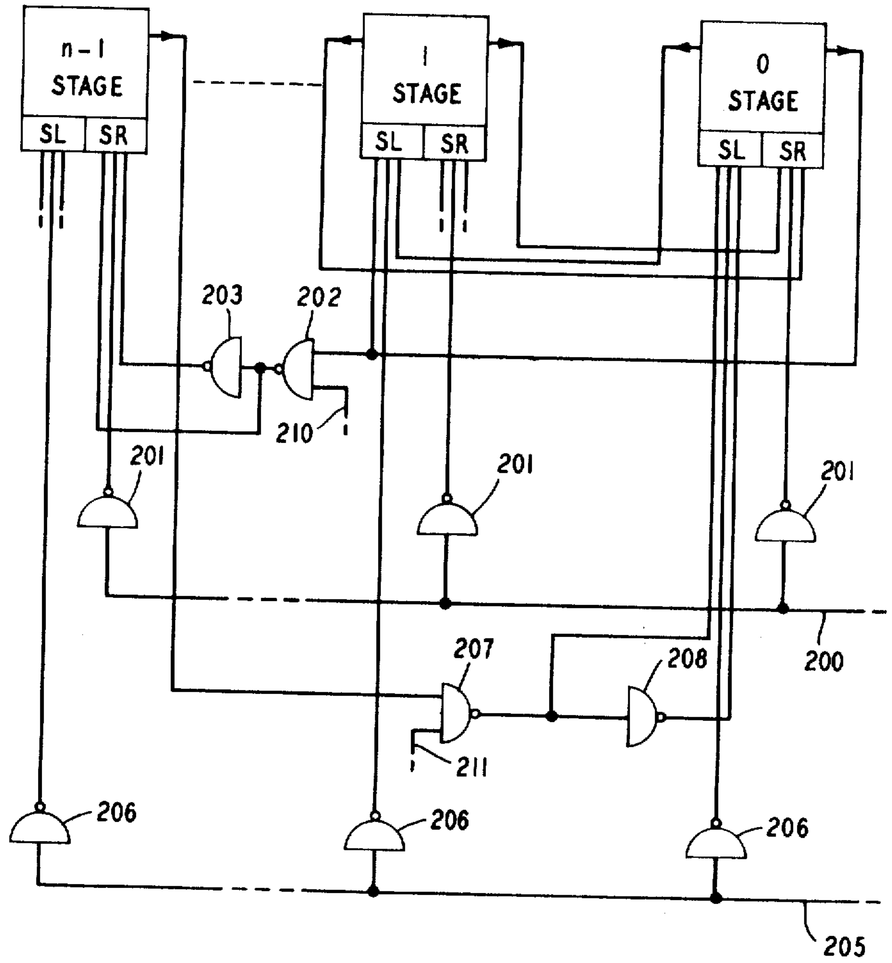
FIG. 2A PRIOR ART
FIGS. 2A and 2B illustrate typical prior art arrangements including N-stage shift registers interconnected so as to perform shift and rotate functions.
Figure 2B:
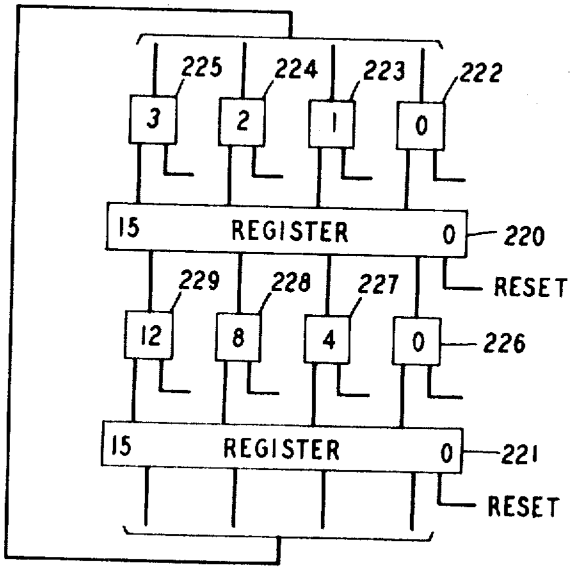
FIG. 2B PRIOR ART

The arrangement in accordance with our invention, as depicted in schematic form in FIG. 1, obtains the advantages of prior art schemes for rotating and/or shifting data such as those depicted in FIGS. 2A and 2B; viz, the reliability of the scheme depicted in FIG. 2A and the speed of the system depicted in FIG. 2B, without the inherent disadvantages of either, particularly with respect to the number of gating circuits required. The basic operations of rotation and shifting of binary data among shift register stages will now be considered in conjunction with these prior art arrangements. Rotation involves moving the data bits or binary digits "1" and "0" to the right or to the left by a predetermined number of register stages within the shift register. The first and last stages of the shift register are interconnected to allow the data bits to reenter the register at either end. The shift operation differs from rotation only in that the first and last stages of the register are not interconnected. Thus, when the data bits are shifted beyond the end stages of the register, they are automatically erased and the opposite end stage of the register receives a predetermined data bit to indicate the empty condition.

As noted in FIG. 2A, N-shift register stages 0,1,...$n-1$, are interconnected to form a right and left rotate and shift arrangement. The binary data within each stage is shifted to the right one position with each clock pulse applied on lead 200 through gates 201 to the shift right, SR, steering circuit in each stage. The number of clock pulses applied on lead 200 will determine the number of stages through which the data is rotated. Right shifting is relatively easy to incorporate as part of the right rotation circuit. This may be accomplished as noted in FIG. 2A by the addition of gates 202 and 203 between the least significant stage and the most significant stage of the shift register. Thus, by disabling gate 202 with a control pulse on lead 210 during a shift right operation, the content of the least significant stage, either a "1" or "0" will be transmitted to stage $n-1$ as a "0." Gate 202 is enabled whenever a rotate right operation is performed.

Left shifting, however, is much more difficult to incorporate into the right rotation circuitry. Thus, it is probably more efficient and economical to provide a separate path for left shifting as indicated in FIG. 2A. Clock pulses on lead 205 will enable the shift left, SL, steering circuit in each stage through gates 206 in order to perform the rotate left operation in similar fashion to the right rotate operation previously described. Gates 207 and 208 are then added to the left rotate circuitry in order to permit the left shift operation to be accomplished. Thus, by disabling gate 207 with a control pulse on lead 211 during a shift left operation, the content of the most significant stage, either a "1" or "0," will be transmitted to the least significant stage as a "0." This same gate 207 is enabled whenever the rotate left operation is to be performed.

This prior art rotate-and-shift operation is completely sequential with the amount of rotation and the number of shifts between stages being controlled directly by the number of clock signals applied to leads 200 and 205. One of the major disadvantages in this type of circuit, of course, is the lack of speed. The shift pulses must occur at a very high repetition rate in order to be functionally compatible with current system requirements.

An alternative arrangement known in the prior art utilizes standard gates in various combinations in order to obtain the desired high speed of operation at the expense of additional gating circuitry. Such an arrangement as shown in FIG. 2B is disclosed, for example, in D. Muir, U.S. Pat. No. 3,374,468 issued Mar. 19, 1968. This scheme involves a double transfer of information between two registers, each transfer resulting in a shifting or skewing of the data between the stages of one register and the stages of the other register.

As noted in FIG. 2B, 16-stage shift registers are employed. Four sets of gates 222–225 connect the first register 220 to the second register 221, and another four sets of gates 226–229 connect register 221 to register 220. In order to afford complete access, each set contains 16 gates, or a total of 128 gates. Gates 222 do not permit a shift of the information among stages in the transfer between registers 220 and 221. Similarly, gates 226 do not permit a shift of the information transferred between registers 221 and 220. The balance of the gates shift the transferred information by the number of stages indicated within the gate block, vis, gates 223 shift the data by one stage in the transfer from register 220 to 221, gates 224 shift the transferred data by two stages, etc., up to gates 229 which shift the data in the transfer between register 221 and register 220 by 12 stages.

In performing a rotation operation in register 220, whereby the stored data is rotated by a predetermined number of stages, the data is first transferred from register 220 to 221 through one of the sets of gates 222–225, the choice being controlled by the lower order two bits, $R_2R_1$, of a four bit binary number, $R_8R_4R_2R_1$, representing the amount of right rotation desired. The subsequent transfer of the data from register 221 to register 220 will be accommodated by one of the sets of gates 226–229, as determined by the higher order two bits, $R_8R_4$. The shifting functions can be added to the right rotation. This, of course, will require additional circuitry beyond the eight sets of gates interconnecting registers 220 and 221.

Figure 3:
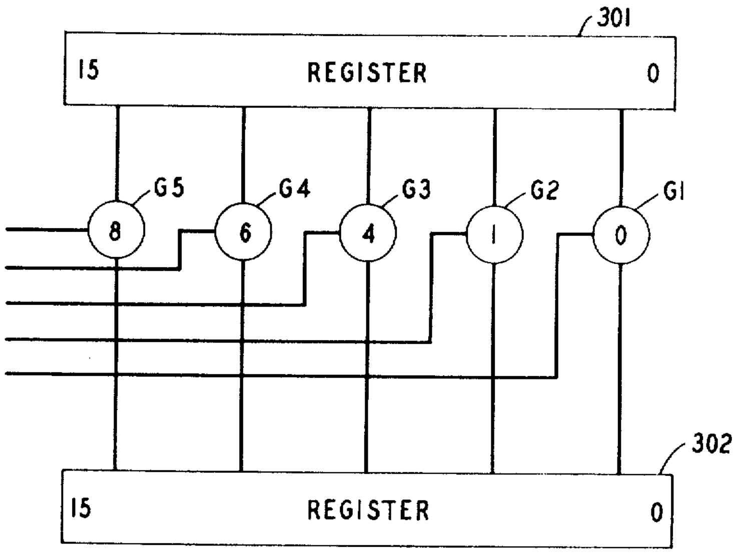
FIG. 3 and FIG. 4 depict shift register arrangements in which the bidirectional gate interconnection illustrated in FIG. 1 may be utilized to advantage.

The advantages to be obtained through utilization of arrangements in accordance with the illustrative embodiment of our invention become evident in the environment of such shift and rotate operations. Thus, FIG. 3 depicts two registers 301 and 302, each register containing 16 stages so as to correspond to the registers depicted in FIG. 2B. Unlike the arrangement in FIG. 2B, however, the shift and rotate operations are performed by five sets of bidirectional gates G1–G5 corresponding to the eight sets of unidirectional gates 222–229 required in the conventional shift and rotate arrangement. Each of the gates G1–G5 represents 16-bidirectional gates, one connected between each of the 16 stages of the two registers 301 and 302, and the numbers within the circles represent the amount of shift each of the gates G1–G5 presents.

The operation of rotating the data through the bidirectional gates between the two registers is similar to the conventional approach except that in this instance the same gates perform the data transfer functions in both directions. The numbers included within each circle representing the distinct set of gates G1–G5 indicate the amount by which the content of register 301 will be rotated to the right during its transfer to register 302. It also represents the amount of rotation to the left experienced by data transferred from register 302 to register 301.

It has been determined that five sets of bidirectional gates is the minimum number which may satisfy this shift and rotate operation. Thus the employment of 16-stage shift registers would require a total of 5×16 or 80 bidirectional gates to perform the necessary shift and rotate functions. By contrast the prior art arrangement illustrated in FIG. 2B would require 128 gates to serve a pair of 16-stage registers.

The manner of performing the rotate function can be understood by considering a single example. Thus, if it is desired to rotate the information contained in register 301 seven positions to the right, it is only necessary to enable gates G5 for a right rotation by eight positions of data from register 301 to register 302. This transfer and rotate operation between the two registers is followed by a left rotation from register 302 to register 301 by one position. This of course is accomplished by enabling gates G2. The net effect of a right rotation by eight and a left rotation by one is the desired right rotation by seven.

If, instead, a left rotation by seven had been required, a reversal of the direction of transfer through gates G5 and G2 would satisfy the requirement.

This symmetry, whereby right and left rotation simply depends upon the order of enabling the two sets of gates, permits left and right shift operations to be performed as an integral part of the rotation operations and, significantly, they may be accomplished by sharing the same circuitry. The best approach to accomplishment of the shift operation is merely to clear selected stages in register 302 prior to transferring the data back to register 301 during a rotation operation. Considering again the seven-stage right rotation in the previous example, data initially is directed through gates G5 to register 302 producing an eight-stage rotation therein. At this point stages 8–14in register 302 are cleared. The data stored in register 302 is then returned to register 301 via gates G2 resulting in a single-stage left rotation in register 301. Thus an intermediate clearing of selected stages (8–14) in register 302 is all that is required to transform a seven-stage right rotation into a seven-stage right shift.

Advantageously, the corresponding left shift operation requires clearance of the identical stages in register 302 intermediate the identical rotation operations conducted in a reverse sequence. Thus a seven-stage left shift will require in sequence (1) a single-stage right rotation from register 301 to register 302 via gates G2, (2) clearance of stages 8–14 in register 302 and (3) an eight-stage left rotation from register 302 to register 301 via gates G5. The fact that the stages to be cleared in register 302 are independent of the direction of the desired shift results in a considerably simplified implementation.

Figure 4:
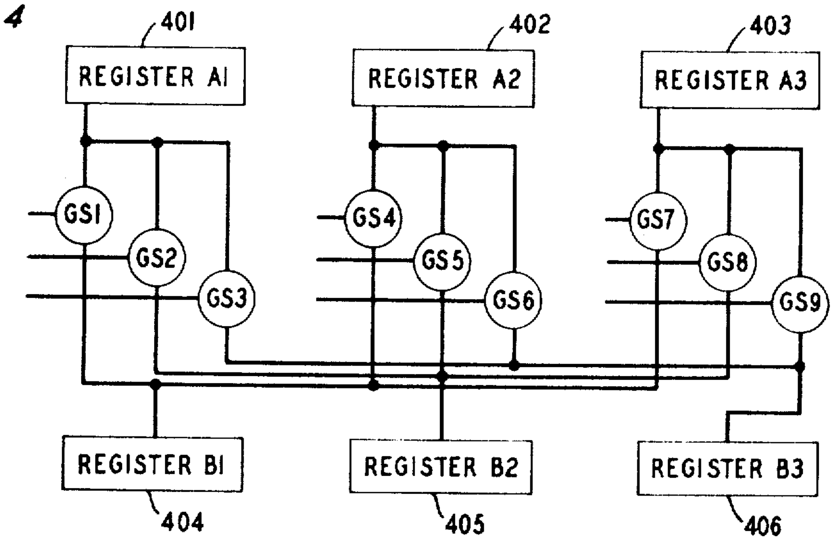

Further advantages stemming from the use of bilateral gates through circuit simplification are evident from consideration of the interconnection of more than two registers to permit the transfer of information therebetween. Thus as indicated in FIG. 4, six 16-stage registers 401–406 are interconnected to permit the previously described shift and rotate operations by a total of nine gate sets GS1 through GS9, each gate set comprising a total of 80 bidirectional gates as described in connection with the circuit in FIG. 3. Thus a total of 720 gates will satisfy this entire operation involving six 16-stage registers, while the prior art arrangement, in accordance with FIG. 2B, would require in this instance a total of 1,152 unidirectional gates.

Beyond mere numbers, however, the flexibility realized by the FIG. 4 arrangement provides distinct advantages. A direct transfer of data from register 401 to register 404 is accomplished simply by enabling gate set GS1. In order to provide a shift or rotation operation in register 401 any one of the remaining registers 404–406 may be utilized as the intermediate register with the actual data transfers occuring upon enablement of the corresponding intermediate gate set GS1, GS2 or GS3. Similarly data may be transferred from register 401 to registers 402 or 403 by utilizing one of the registers 404–406 as an intermediary. In this instance two distinct gate sets would be operated in sequence; the first gate set transferring the data from register 401 to one of the intermediary registers and the second gate set transferring the data from the intermediary register to the final destination register 402 or 403.

Figure 5:
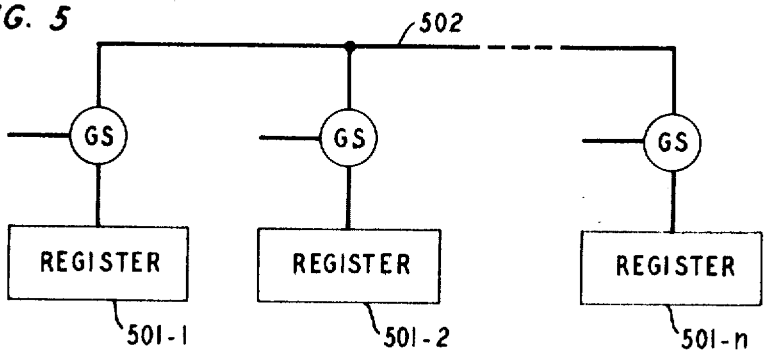
FIG. 5 is a block diagram of a shift register arrangement similar to that depicted in FIG. 4, but in this instance utilizing a time-division bus in accordance with certain aspects of this invention.

The flexibility indicated in the arrangement of FIG. 4 is even more apparent in consideration of another aspect of this invention as illustrated in FIG. 5 in which the actual data transfer operations are time shared. Thus any number of registers 501–1 through 501–*n* may be interconnected via a single time shared bus 502 by gate sets GS corresponding to those illustrated in FIG. 4 when a transfer between any pair of registers 501–1 through 501–*n* is desired. The pair of gate sets GS connected to these registers are enabled simultaneously thus permitting a transfer in either direction between the registers via time division bus 502. The only restriction imposed on this operation, of course, is that only a single transfer between a pair of registers can occupy bus 502 at any given time. Such a restriction is not critical, however, considering that the speed of operation is relatively high. Moreover, the economic advantage is apparent due to the dramatic reduction in the number of gates required to facilitate this operation.

It is to be understood that the above-described arrangement is illustrative of the application of the principles of the invention. Numerous other arrangements may be devised by those skilled in the art without departing from the spirit and scope of this invention.

What is claimed is:

1. In combination, a pair of bistable devices each having a signal terminal; and a bidirectional gate connected between the corresponding signal terminals of said pair of bistable devices, said gate having a single control terminal, said gate being enabled to transfer signals therethrough in either direction responsive to a single control signal on the same said control terminal.

2. In combination, a pair of identical bistable devices each having a signal terminal and a control terminal, a bidirectional gate having two transmission terminals and only a single control terminal, each of said transmission terminals being directly and similarly connected to a different one of said signal terminals, and means for determining the direction of transfer of information between said devices comprising means for selectively energizing said control terminal of one of said devices and means operative thereafter for enabling said bidirectional gate via said gate control terminal.

3. In combination, a plurality of multistage shift registers interconnected to permit shift and rotate operations, the interconnections comprised solely of a plurality of bidirectional gates connected between corresponding signal terminals of said shift register stages, each gate having only a single control terminal, singly energizable to permit transmission of signals in either direction between its connected shift register stages, said transmission being in a direction toward a stage being priorly placed in a clear state, and means for determining said transmission direction comprising only means for clearing certain of said register stages.

4. The combination in accordance with claim 3, further including a common bus to which said bidirectional gates are connected, said gates being enabled in pairs simultaneously.

5. In combination, a first and second bistable device each having corresponding signal terminals and means for applying the state of either one of said bistable devices directly to the other of said bistable devices to alter the state thereof, said means comprising a gating circuit capable of transmitting signals in opposite directions between said devices and having transmission terminals and only a single control terminal, said circuit transmitting signals in either direction upon a single activation of the same said control terminal, only one of said gating circuit transmission terminals being connected to a signal terminal of said first bistable device and only the other of said gating circuit transmission terminals being connected to a signal terminal of said second bistable device.

6. In combination, a pair of bistable devices each having a signal terminal at which different DC potentials appear depending on the state of the device, a bidirectional gate connected between a signal terminal of one of said devices and a signal terminal of the other of said devices, and single control terminal means for enabling said bidirectional gate to apply the DC potential at the signal terminal of either one of said devices directly to the signal terminal of the other of said devices upon a single activation of the same said control terminal.

* * * * *